US007236356B2

(12) United States Patent
Ulla et al.

(10) Patent No.: US 7,236,356 B2
(45) Date of Patent: Jun. 26, 2007

(54) EXTERNAL BATTERY PACK

(75) Inventors: Imran Ulla, Austin, TX (US); Mark Rylander, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 112 days.

(21) Appl. No.: 10/691,035

(22) Filed: Oct. 22, 2003

(65) Prior Publication Data

US 2005/0088811 A1 Apr. 28, 2005

(51) Int. Cl.
*G06F 1/16* (2006.01)
(52) U.S. Cl. ..................... 361/683; 361/681
(58) Field of Classification Search ........ 361/679–868; D14/341, 342
See application file for complete search history.

(56) References Cited

U.S. PATENT DOCUMENTS

| 4,926,365 | A | * | 5/1990 | Hsieh | 361/683 |
|---|---|---|---|---|---|
| 5,128,829 | A | * | 7/1992 | Loew | 361/683 |
| 5,132,876 | A | * | 7/1992 | Ma | 361/680 |
| 5,133,076 | A | | 7/1992 | Hawkins et al. | 395/800 |
| 5,251,105 | A | * | 10/1993 | Kobayashi et al. | 361/683 |
| 5,329,289 | A | | 7/1994 | Sakamoto et al. | 345/126 |
| 5,436,792 | A | | 7/1995 | Leman et al. | 361/686 |
| 5,552,957 | A | | 9/1996 | Brown et al. | 361/683 |
| 5,619,397 | A | | 4/1997 | Honda et al. | 361/686 |
| 5,668,570 | A | | 9/1997 | Ditzik | 345/173 |
| 5,832,080 | A | | 11/1998 | Beutler et al. | 379/433 |
| 5,859,762 | A | | 1/1999 | Clark et al. | 361/686 |
| 5,899,421 | A | | 5/1999 | Silverman | 248/175 |
| 5,915,661 | A | | 6/1999 | Silverman et al. | 248/465.1 |
| 6,173,933 | B1 | | 1/2001 | Whiteside et al. | 248/276.1 |
| 6,178,087 | B1 | * | 1/2001 | Cho et al. | 361/686 |
| D439,908 | S | | 4/2001 | Gozani | D14/434 |
| 6,282,082 | B1 | * | 8/2001 | Armitage et al. | 361/681 |
| 6,494,736 | B2 | | 12/2002 | Mito | 439/385 |
| 6,594,146 | B2 | | 7/2003 | Frangesch et al. | 361/686 |
| 6,639,790 | B2 | * | 10/2003 | Tsai et al. | 361/683 |
| 6,700,775 | B1 | * | 3/2004 | Chuang et al. | 361/680 |
| 6,859,365 | B2 | * | 2/2005 | Koiwa et al. | 361/687 |
| 6,882,524 | B2 | * | 4/2005 | Ulla et al. | 361/680 |
| 2001/0022719 | A1 | * | 9/2001 | Armitage et al. | 361/681 |
| 2003/0222149 | A1 | * | 12/2003 | Solomon et al. | 235/472.01 |

FOREIGN PATENT DOCUMENTS

| EP | 0 581 286 A1 | | 7/1993 |
|---|---|---|---|
| EP | 1227387 A1 | * | 7/2002 |
| JP | 08087351 A | | 4/1996 |
| JP | 9251328 A | | 9/1997 |
| JP | 10154041 A | | 6/1998 |
| WO | WO 01/84729 A1 | | 11/2001 |

OTHER PUBLICATIONS

The Raymond Sarrio Company's External Laptop Battery: www.sarrio.com/sarrio/12voltlaptop.html; Sep. 22, 2003; 5 pages.

* cited by examiner

*Primary Examiner*—Lisa Lea-Edmonds

(57) ABSTRACT

A device is provided which comprises (a) a portable computer (13) having first and second major opposing surfaces and having a display (31) disposed on the first major surface, and (b) a protective cover (11) adapted to releasably engage the computer in a first orientation in which it covers the display. The cover has a removable battery pack (37) disposed therein.

23 Claims, 10 Drawing Sheets

EXTERNAL BATTERY PACK

TECHNICAL FIELD OF THE INVENTION

The present invention pertains generally to modular tablet computer systems, and more particularly to covers and battery packs for such systems.

BACKGROUND OF THE INVENTION

Personal computers have recently become very popular for a variety of uses ranging from home, office, engineering, sales, marketing, and military applications. Virtually every aspect of business, engineering and science utilizes some form of computer system on a daily basis. Since their introduction, personal computers have become increasingly compact while simultaneously becoming increasingly powerful. This progression of smaller and more powerful personal computers has reached the point that some personal computer manufacturers are providing a tablet personal computer, or "tablet PC."

The tablet PC is a fully functional personal computer, which may include a Microsoft Windows® operating system or other such operating systems as are known to the art. The tablet PC not only is capable of running familiar productivity applications such as Microsoft's WORD®, EXCEL® and POWERPOINT®, but also offers the same rich connectivity to the Internet that a desktop or notebook PC provides. In addition, the tablet PC adds the simplicity of pen and paper, because the user can write on the screen for data input.

As tablet PCs have become increasingly popular, users have come to expect these systems to have all of the features of bulkier desktop models. Consequently, the power demands made on the battery packs for these systems has increased significantly. On the other hand, portability is a key feature for tablet PCs. Hence, the battery packs made for these systems must provide several hours of use between charging. In bulkier laptop PCs, extended battery life can be achieved by providing additional battery packs. However, this is a difficult solution to implement in tablet PCs, since there is little additional space in the chassis of such systems to accommodate additional battery packs. The situation is complicated by the fact that the battery packs must be readily accessible so that they can be removed for recharging, if necessary, or so that depleted packs can be readily replaced with recharged units.

There is thus a need in the art for a battery pack suitable for use in tablet PCs that does not add significantly to the bulk of the tablet PC, that provides additional battery life, and that is easy to replace or recharge. These and other needs are met by the devices and methodologies disclosed herein and hereinafter described.

SUMMARY OF THE INVENTION

In one aspect, a device is provided which comprises a portable computer, such as a tablet PC, which has first and second major opposing surfaces and which has a display disposed on the first major surface. The device further comprises a protective cover with a (preferably removable) battery pack disposed therein. The cover, which is also preferably removable, is adapted to releasably engage the computer in a first orientation in which it covers the display, and is preferably further adapted to releasably engage the computer in a second orientation in which it does not cover the display. Even more preferably, the cover is further adapted to releasably engage the computer in a second orientation in which it covers the second major surface. Preferably, the battery pack is in electrical communication with the internal circuitry of the tablet PC when the cover is in the second orientation. It is also preferred that the battery pack is removable from the exterior surface of the cover when the cover is in the second orientation.

The cover may have a plurality of battery packs disposed therein, each of which may comprise a plurality of batteries. Preferably, the cover has a depression therein or other means which releasably engages the battery pack. The battery pack may have an indicator thereon which indicates the degree to which the battery is charged. Preferably, the cover has first and second opposing ends, the first end has a plurality of protrusions adapted to engage a lip disposed on a first side of said computer, and the second end has a protrusion thereon adapted to engage a depression in a second side of said computer.

The cover may be adapted to power a peripheral device, such as a disk drive or a cell phone. In some embodiments, the computer has internal batteries, and the cover is adapted to be connected to an external power source and to thereby recharge the battery pack disposed in the cover. In such embodiments, the cover may be further adapted to recharge the internal batteries of the computer. In another aspect, a tablet PC is provided which comprises a chassis having first and second major opposing surfaces and having a display disposed on said first major surface. A protective cover is provided which is preferably removable and which is adapted to releasably engage the PC in a first orientation in which it covers said display, and which is further adapted to releasably engage the PC in a second orientation in which it covers the second major surface. A (preferably removable) battery pack is disposed in said cover. Preferably, the battery pack is in electrical communication with the internal circuitry of the tablet PC when the cover is in the second orientation. It is also preferred that the battery pack is removable from the exterior surface of the cover when the cover is in the second orientation. The cover of the tablet PC may be adapted to provide an AC current to or to otherwise power a peripheral device, such as a disk drive or a cell phone. In some embodiments, the PC has internal batteries, and the cover is adapted to be connected to an external power source and to thereby recharge the battery pack disposed in the cover. In such embodiments, the cover may be further adapted to recharge the internal batteries of the computer.

One skilled in the art will appreciate that the various aspects of the present disclosure may be used in various combinations and sub-combinations, and each of those combinations and sub-combinations is to be treated as if specifically set forth herein.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
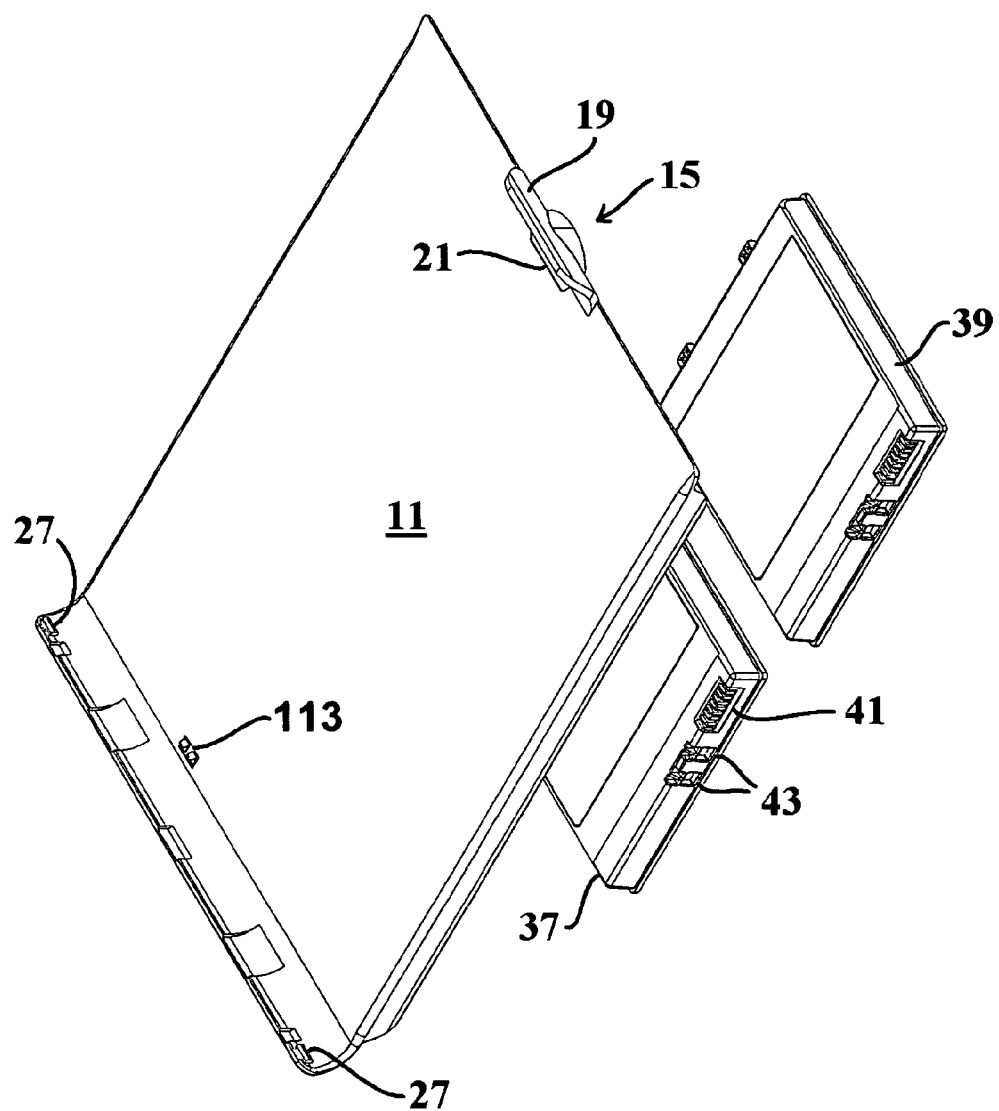
FIG. 1 is a perspective view of the interior of a tablet PC cover/battery pack combination with the battery pack removed from the cover.

It has now been found that the aforementioned needs can be met by providing a tablet PC with a protective cover that houses one or more battery packs. These battery packs may be in addition to, or in lieu of, any battery packs that may be housed in the chassis of the PC. Since the protective cover must have a relatively large surface area in order to protect the display, and since battery packs can be made relatively thin, the battery packs can be disposed in bays created in the exterior surface of the protective cover without adding significantly to the bulk of the cover or the tablet PC as a whole.

Moreover, since the battery packs are disposed on an external surface of the cover, they are readily accessible, and can be easily removed or replaced. Also, since the battery packs are disposed on an external surface, they can be provided with LED lights or other such means that indicate the status of the battery. In addition, the PC can be constructed such that the battery packs are disposed on a bottom surface of the PC so that the battery packs are visible only when the tablet PC is being transported, thereby maximizing the aesthetic features of the device.

The preferred embodiments of the devices and methodologies described herein will now be illustrated with reference to FIGS. 1-9, with like numerals being used to refer to like and corresponding parts of the various drawings. As seen therein, a cover 11 for a tablet PC 13 (see FIGS. 3 and 5-9) is provided. The cover has a latch 15 (see FIGS. 1 and 5-7) on a first end which comprises a wall 19 with a protrusion 21 thereon, and which engages a receptacle 23 (see FIG. 6) in the chassis of the PC. The opposing or second end of the cover has a plurality of protrusions 27 (see FIGS. 1 and 5-9) thereon that likewise engage a lip 29 (see FIG. 9) disposed on the chassis of the PC. The latch 15 and protrusions 27 serve to secure the cover to the PC when the PC is not in use in such a way that the display 31 (see FIGS. 6-8) of the PC is covered and protected.

Figure 2:
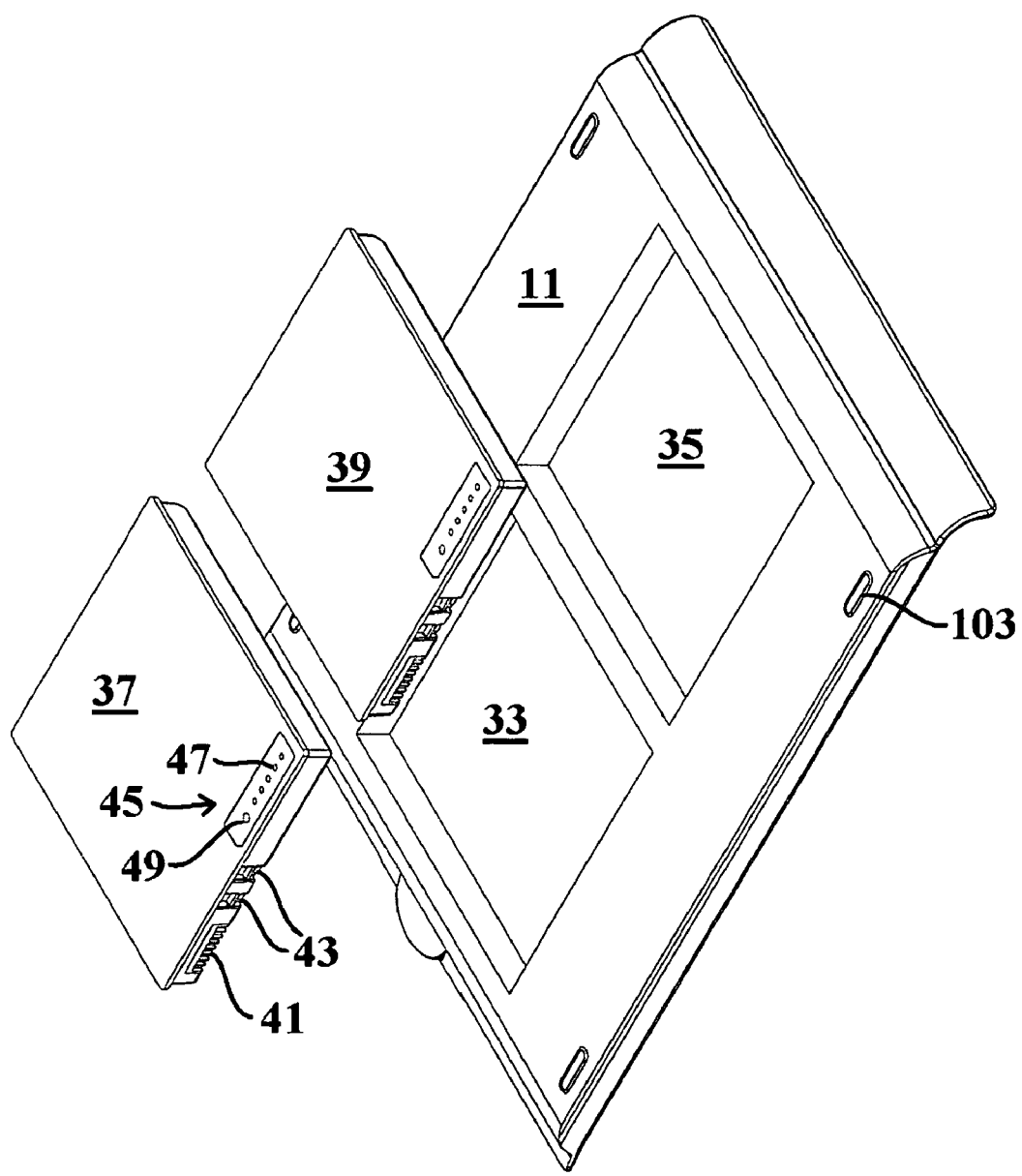
FIG. 2 is a perspective view of the exterior of a tablet PC cover/battery pack combination with the battery pack removed from the cover.
Figure 3:
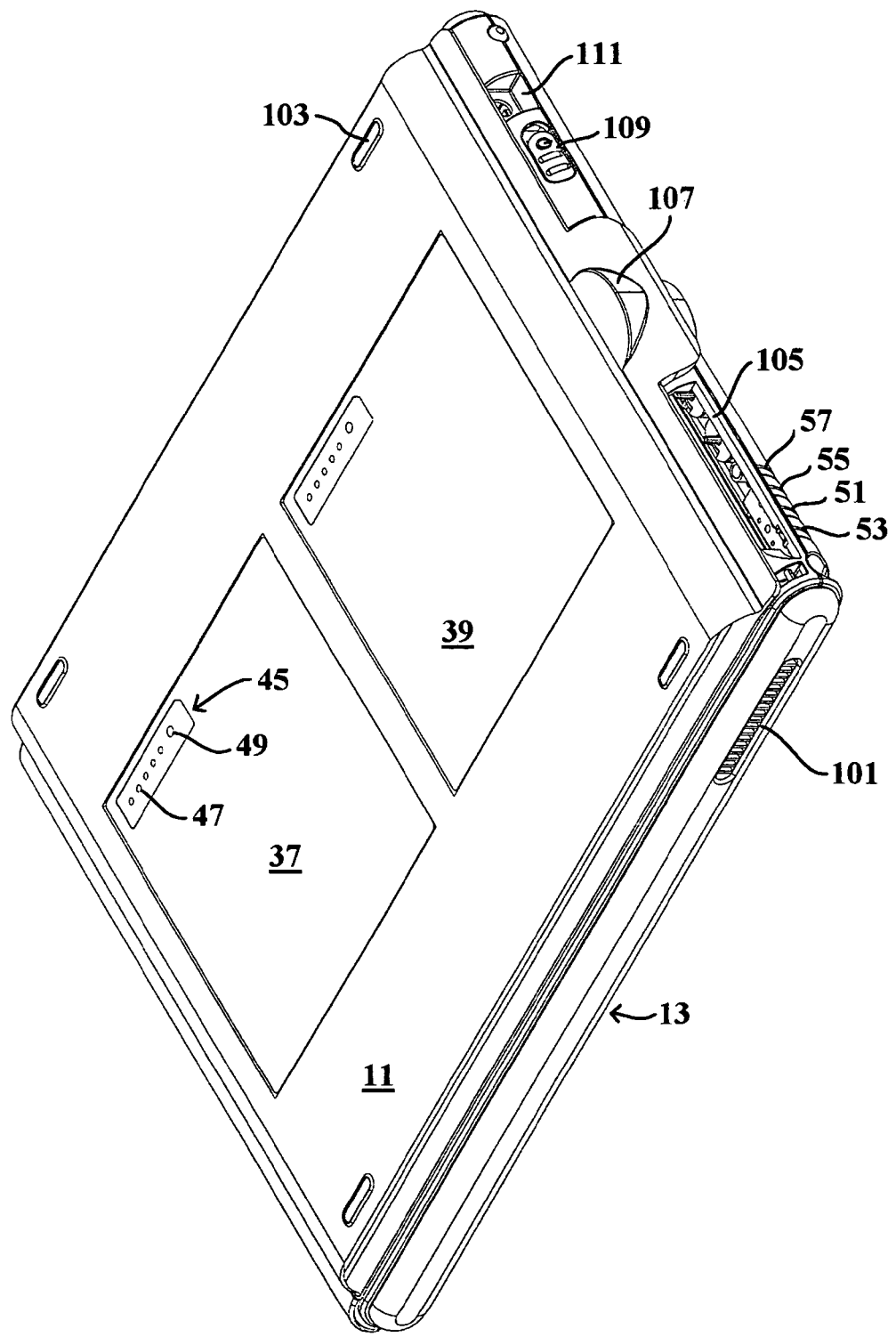
FIG. 3 is a perspective view of the exterior of a tablet PC cover/battery pack combination (disposed in a closed position on the PC)
Figure 4:
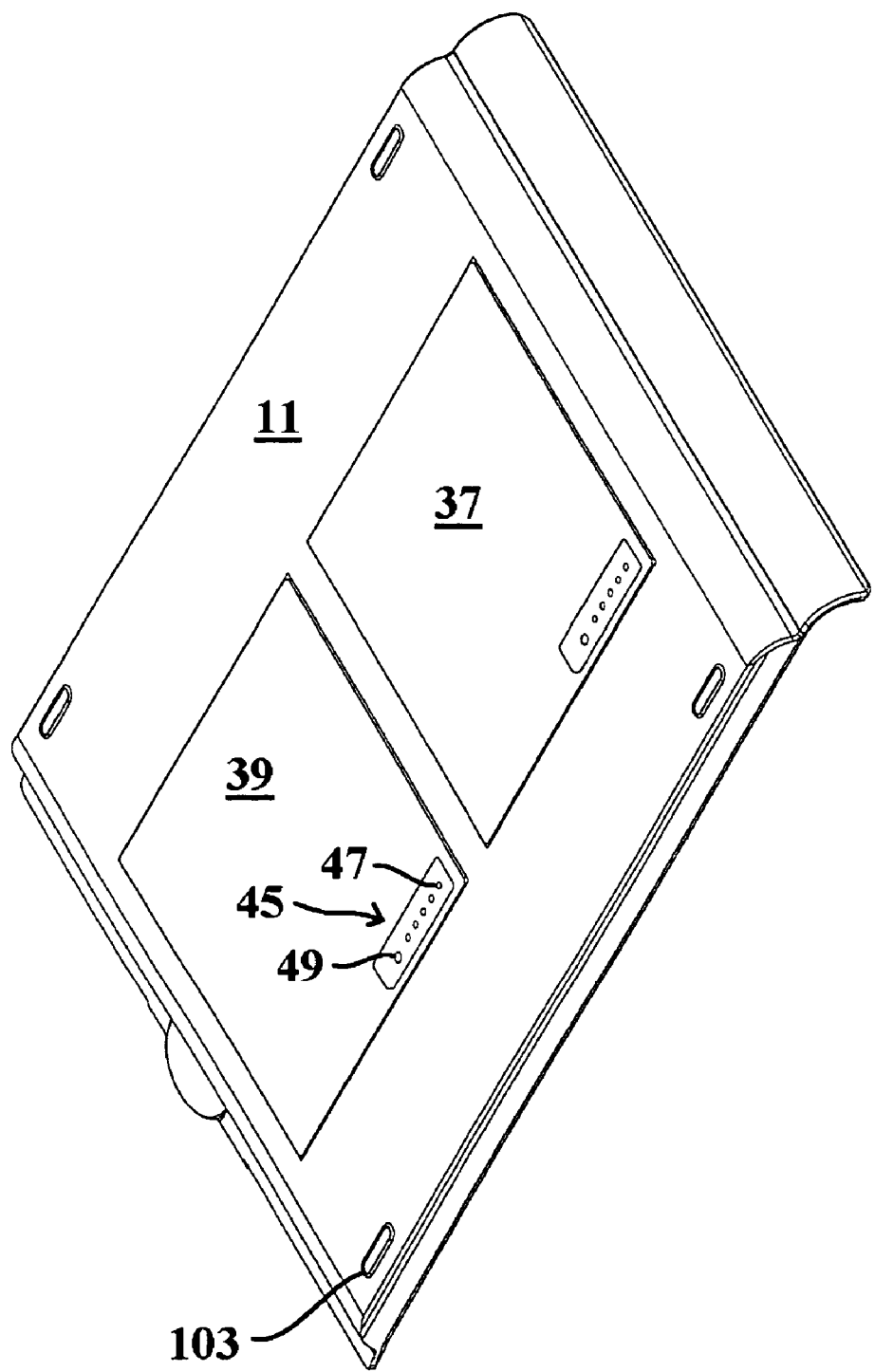
FIG. 4 is a perspective view of the exterior of a tablet PC cover/battery pack combination.

As best seen in FIGS. 2-4, the protective cover 11 is provided with first 33 and second 35 bays (see FIG. 2) that house first 37 and second 39 battery packs (see FIGS. 3 and 4), respectively. It will be understood, of course, that various embodiments are possible, including those in which the cover houses only a single battery pack, and those in which the cover houses more than two battery packs. Moreover, the battery packs may consist of a single battery or multiple batteries, and may also contain various other elements, such as protective coverings or circuitry, as are commonly employed in battery packs.

The bays are preferably constructed such that they releasingly engage the battery packs such that the battery packs are held securely in the bays during use, but can be readily removed from the bays using only a normal amount of manual pressure when it is necessary to replace or recharge them. This may be accomplished, for example, through the use of protrusions or resilient members on the battery packs which releasably engage the surfaces of the bays.

Each of the battery packs is equipped with electrical connectors 41, 43 (see FIGS. 2 and 7) that are adapted to releasably connect the anode(s) and cathode(s) of the battery pack to the internal circuitry of the PC. Each battery pack is also provided with an indicator 45 (see FIGS. 2-4) on its external surface which indicates the status of the battery. In the particular embodiment depicted, the indicator includes a five-LED battery gauge 47. Each LED in the gauge represents about 20% of available power, and the gauge can be activated by pushing the activation button 49 next to the LEDs. It will be appreciated, however, that various other types of indicators may be employed to give a reading on battery status.

In addition to any indicators present on the battery packs, the tablet PC may also be equipped with means for indicating the status of the battery packs, either singly or collectively, in a manner that will alert the user to the status while the PC is in use. Such means may include audio or visual indications.

Figure 6:
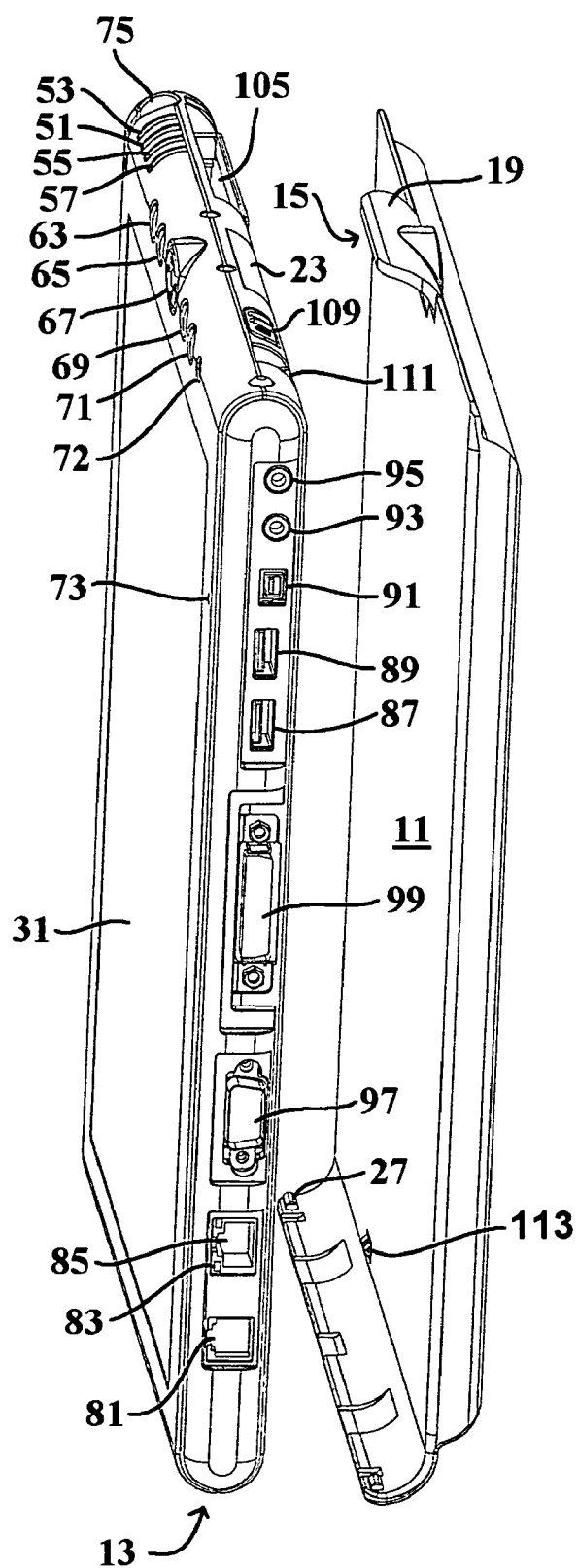
FIG. 6 is a perspective view of a tablet PC cover/battery pack combination illustrating how the combination couples to the tablet PC.
Figure 7:
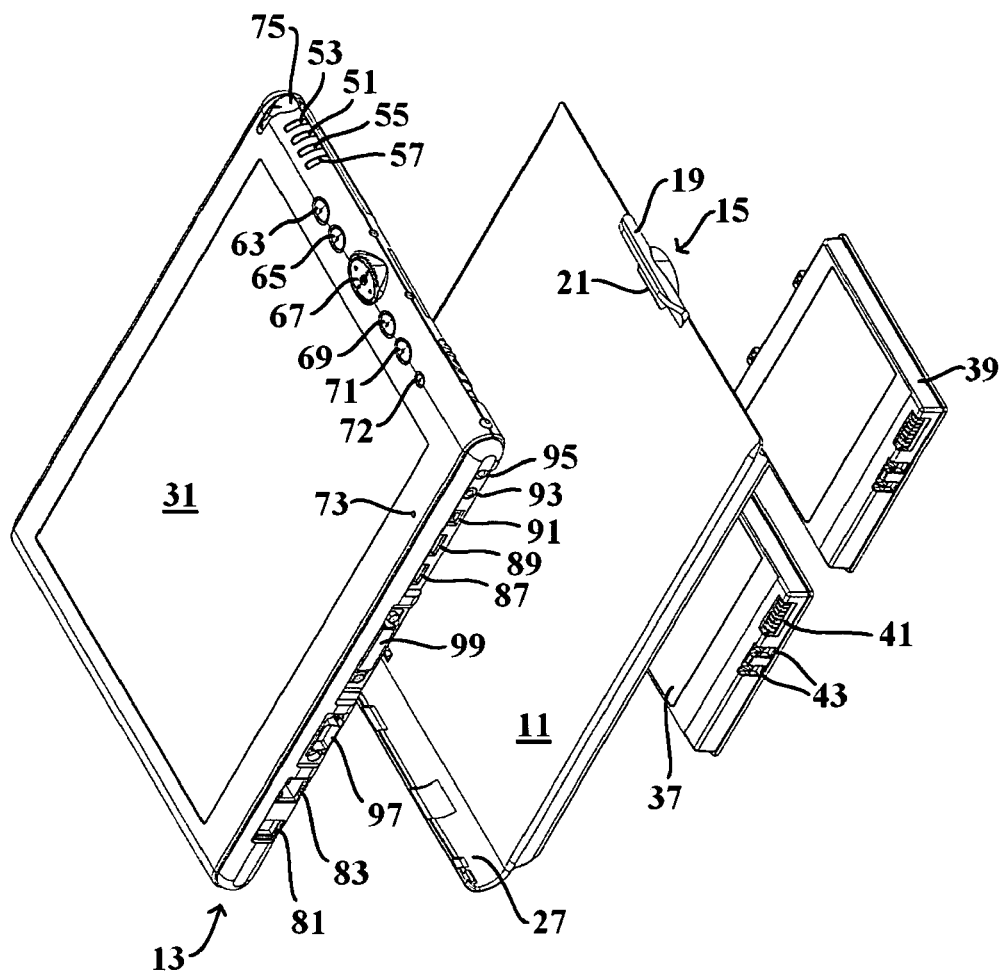
FIG. 7 is a perspective view of a tablet PC and a tablet PC cover/battery pack combination with the battery pack removed from the cover.
Figure 8:
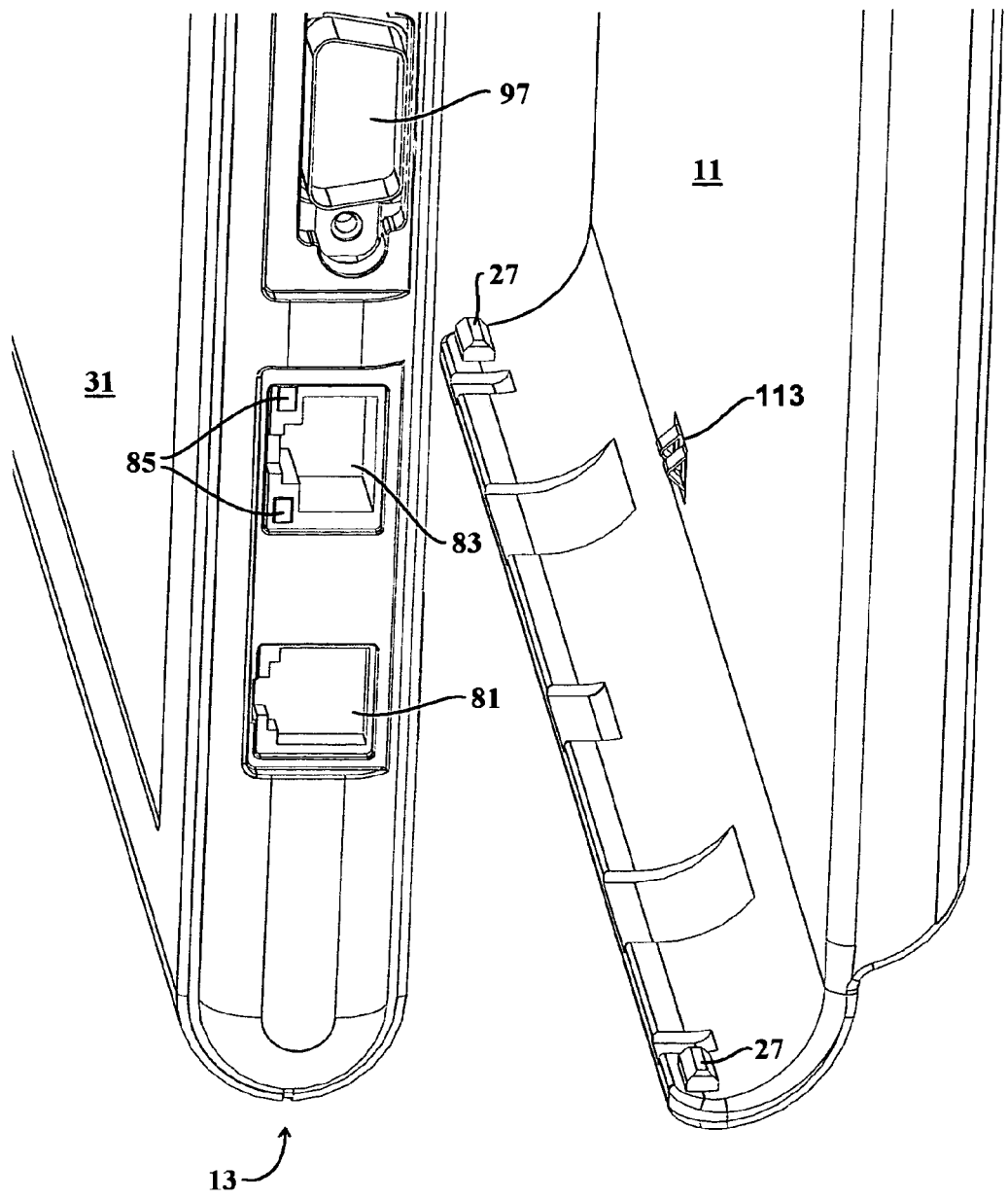
FIG. 8 is a perspective view of a tablet PC cover/battery pack combination illustrating how the combination couples to the tablet PC.
Figure 9:
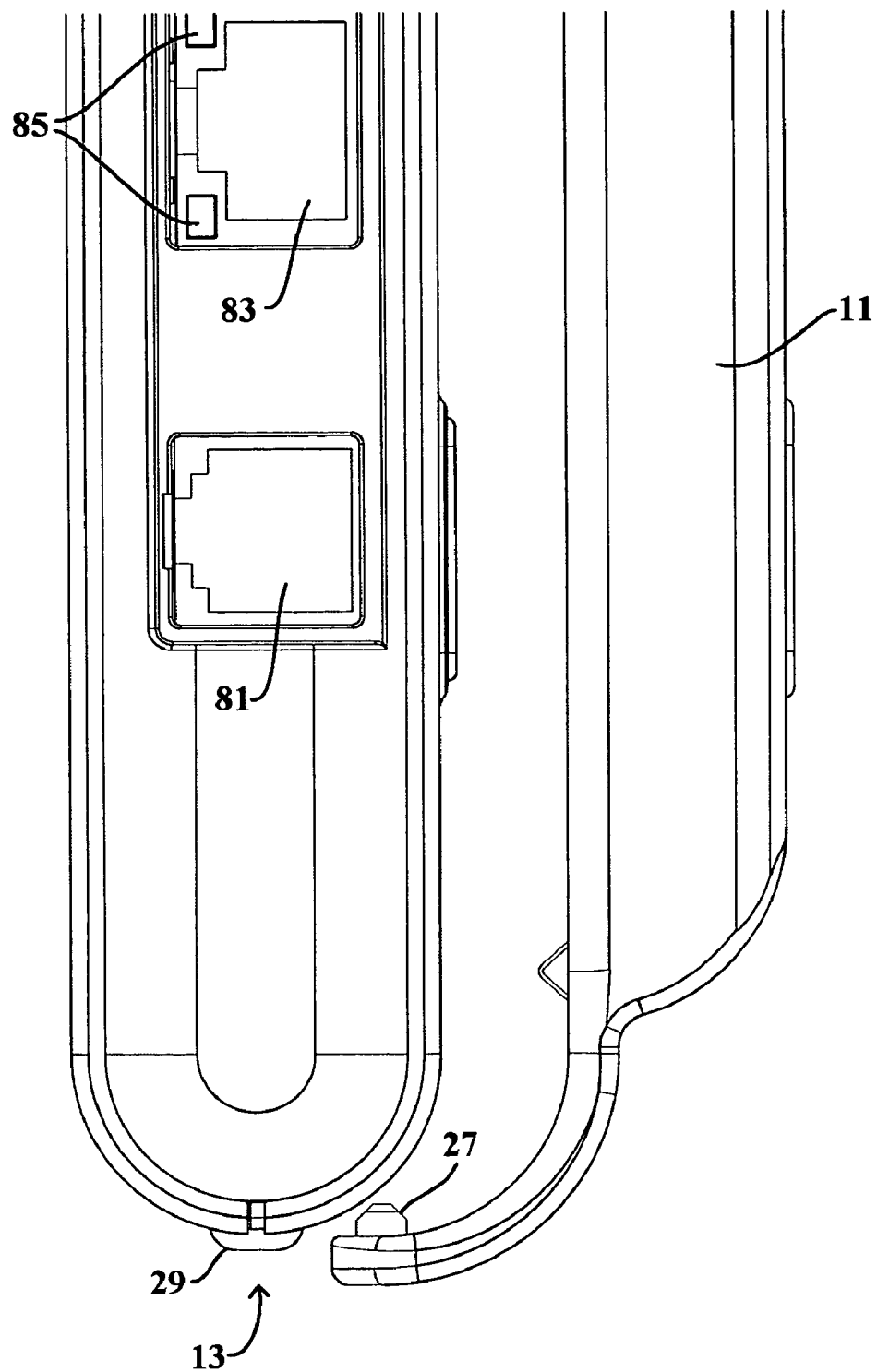
FIG. 9 is a perspective view of a tablet PC cover/battery pack combination illustrating how the combination couples to the tablet PC.

For example, in the particular embodiment depicted in FIG. 7, the surface of the PC adjacent to the display is provided with a battery indicator light 51 (see FIGS. 6 and 7) that indicate when the battery is fully charged, when the battery is charging, when the battery is overheated or defective, when the battery is discharging abnormally, and/or when the battery is approaching depletion (e.g., less than 10% charged). The battery indicator lights may also flash, emit a steady glow, emit certain colors, or use combinations of the foregoing to indicate battery or charging status. In the particular embodiment depicted, a power LED 53 is provided which indicates when the PC is connected to a power source, a hard disk drive (HDD) indicator 55 is provided which indicates the status of the hard disk drive, and a wireless network indicator 57 is provided which indicates the status of the connection of the PC to a wireless network.

Computers incorporating the protective covers and battery packs described herein may have various features as are known to the art, and the covers may be designed to allow convenient use of, or access to, these features, while at the same time protecting the PC from harm. In the particular embodiment illustrated in FIG. 7, these features include a liquid crystal display 31, which may include protective layers made out of acrylic or other such materials that provide a hard writing surface, minimize glare, and improve viewability; an escape key 63; a function key 65; a 5-way directional control button 67; first 69 and second 71 hot keys; a security key 72; an external microphone 73; and a pen holder 75.

Figure 5:
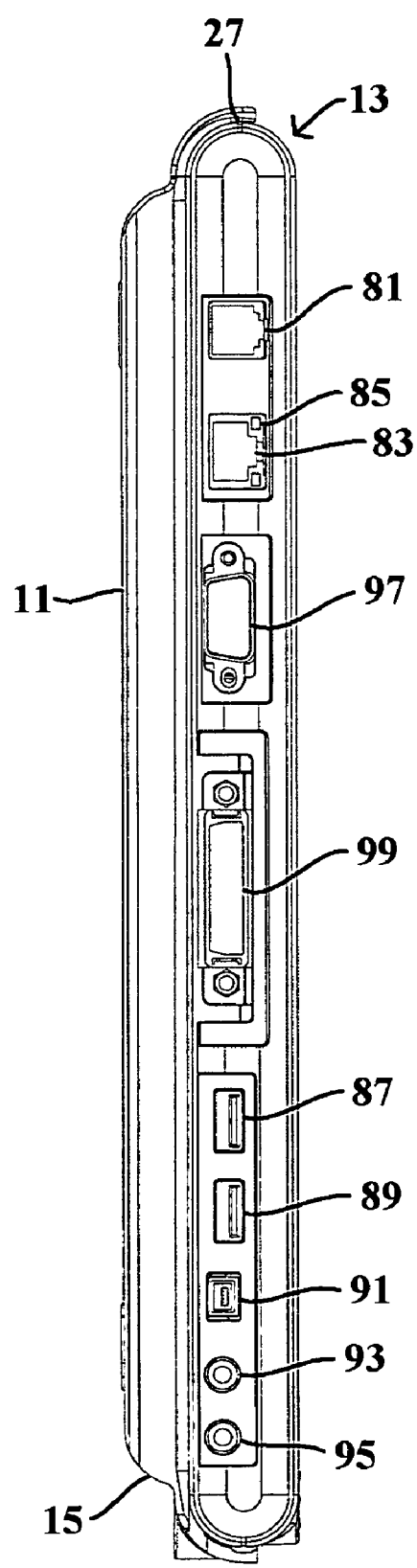
FIG. 5 is a rear view of a tablet PC cover/battery pack combination disposed on a tablet PC.

As shown in FIGS. 5-7, the PC may further include an RJ-11 port 81 that supports a standard phone cord connector; an RJ-45 Ethernet LAN port 83 (shown in this embodiment with dual status LEDs 85) that facilitates connection of the PC to a network, cable modem, or xDSL; first 87 and second

89 USB connectors; an IEEE 1394 connector 91; an audio-in (microphone) jack 93; an audio-out (headphone) jack 95; a VGA monitor connector 97; and a flex-dock connector 99. With reference to FIG. 3, the PC is also provided with speakers 101 and non-skid pads 103. With reference to FIG. 5, the PC is further provided with a PCA card slot 105; an antenna 107; a power switch 109; and an AC power jack 111.

The protective cover can be made from various materials. For example, it may be constructed out of various metals or metals alloys. Magnesium alloys are especially preferable since they are lightweight, durable, and easy to maintain. The cover may also be fabricated or molded out of a variety of plastics.

Preferably, the cover is adapted to be releasably attached to the PC in a first orientation in which it protects the display, as when the PC is being transported or is not in use. It is also preferred that the cover is adapted to be attached to the PC in a second orientation in which it is connected to the bottom of the PC when the PC is in use, thus providing convenient storage for the cover. Moreover, the cover is provided with an electronic interface 113 such that, when the cover is in the second orientation, the battery pack is in electrical communication with the internal circuitry of the PC, thus allowing the battery pack to power the PC.

Various battery types may be utilized in the battery packs described herein. These batteries may be based on various chemistries, and may have one or more cells. Preferably, each battery pack comprises one or more lithium-ion batteries, and more preferably, each battery pack comprises a 6-cell lithium-ion battery. Fully charged, a battery pack of this type is capable of powering a tablet PC for over 4 hours, depending on conditions and use. Hence, in embodiments of the tablet PCs described herein which incorporate dual battery packs, the battery packs can provide over 8 hours of usage before recharging is necessary.

Figure 10:
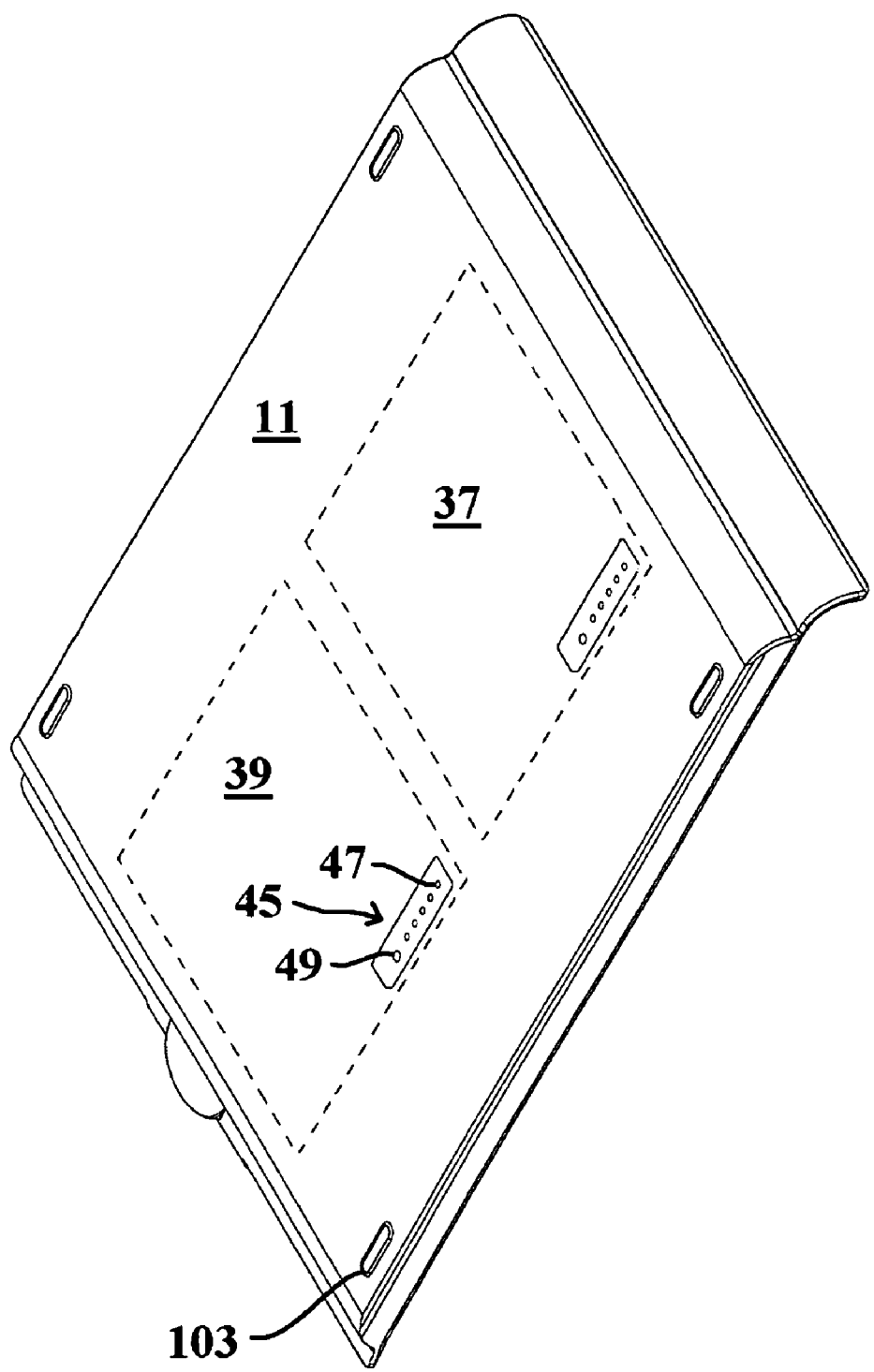
FIG. 10 is a perspective view of the exterior of a tablet PC cover/battery pack combination in which the battery pack is integral with the PC cover.

In many of the embodiments described herein, the battery packs are removable. However, it will be appreciated that embodiments of the PC cover/battery pack combinations may also be made in accordance with the teachings herein in which the battery packs form an integral part of the PC cover. One such embodiment is illustrated in FIG. 10, which shows with dashed lines one possible placement of the battery packs 37, 39 within the cover 11 (the profile of this embodiment would be similar to that shown in FIG. 9). In the particular embodiment depicted, each of the battery packs is provided with an external indicator 45 showing the charge status of the battery packs. However, it will be appreciated that the external indicators are not necessary, and that other means as described above could be provided for indicating battery charge status.

It is also to be noted that, while the battery packs may be designed to be removable so that they can be placed in an external battery charger and recharged, they may also be designed to be rechargeable in situ, or they may be designed for recharging in either manner. If the battery pack is designed to be rechargeable in situ, the PC cover, the PC itself, and/or the battery packs may be equipped with one or more suitable power input ports which are adapted to couple with an external battery charger or power source. The PC cover, the PC itself, and/or the battery packs may also be provided with appropriate circuitry to enable or facilitate recharging. Thus, for example, in some embodiments, the battery packs may be recharged simply by attaching a battery charger to the PC and then attaching the cover (in either orientation) to the PC.

The cover may also be adapted to serve as an auxiliary power source for charging the internal batteries of the PC. Since the cover is typically removed from the PC while the PC is in use, the cover can be attached to a wall outlet or other AC or DC external power source during PC usage. Later, when the PC is no longer being used, the cover can be removed from the external power source and attached to the PC, where it recharges the internal PC batteries. Thus, in embodiments of this type, the internal batteries of the PC can be recharged when the device is in storage or is otherwise idle. The battery packs in the cover may be of a type that recharge very rapidly upon connection to the external power source, and then provide a slower (and typically safer) recharge of the internal PC batteries.

In addition to serving as a power source for the PC, the cover may also be utilized as either a primary or auxiliary AC or DC power source for various peripheral devices, and may be provided with appropriate circuitry and couplings for this purpose. Thus, for example, the cover may be adapted to serve as a power source for external disk drives, such as RW CD or DVD drives, displays, printers, scanners, hubs, speakers, and the like. It may also be adapted to serve as a primary or auxiliary power source for various other devices, such as cell phones, PDAs (Personal Digital Assistants), audio or video digital recorders, cameras, or radios. The cover may be provided with various ports to enable the cover to be coupled to these devices, or it may be provided with a single port and various adapters for this same purpose.

In some embodiments, the cover may be adapted to recharge the internal batteries of the PC while at the same time serving as a power source for a peripheral device. For example, the cover may be adapted to recharge the internal batteries of the PC while at the same time providing a low voltage (e.g., 5V) power source for a cell phone.

Although the present invention is described in detail, it should be understood that various changes, substitutions and alterations can be made hereto without departing from the spirit and scope of the invention.

What is claimed is:

1. A device, comprising:
   a portable computer having first and second major opposing surfaces and having a display disposed on said first major surface; and
   a protective cover adapted to releasably engage said computer in a first orientation in which it covers said display, said cover having a battery pack disposed therein
   wherein said cover is further adapted to releasably engage said computer in a second orientation in which it covers said second major surface.

2. The device of claim 1, wherein said battery pack is in electrical communication with the internal circuitry of said computer when said cover is in the second orientation.

3. The tablet PC of claim 2, wherein said battery pack is removable from the exterior surface of said cover when said cover is in the second orientation.

4. The device of claim 1, wherein said cover has a plurality of battery packs disposed therein.

5. The device of claim 4, wherein each battery pack comprises a plurality of batteries.

6. The device of claim 1, wherein said cover releasably engages said battery pack.

7. A device, comprising:
   a portable computer having first and second major opposing surfaces and having a display disposed on said first major surface; and a protective cover adapted to releasably engage said computer in a first orientation in which it covers said display, said cover having a battery pack disposed therein with; and an indicator which indicates the degree to which the level of battery charge.

8. The device of claim 7, wherein said cover has a depression therein which releasably engages said battery pack.

9. The device of claim 7, wherein said cover has first and second opposing ends, wherein said first end has a plurality of protrusions adapted to engage a lip disposed on a first side of said computer, and wherein said second end has a protrusion adapted to engage a depression in a second side of said computer.

10. The device of claim 7, wherein said cover is adapted to power a peripheral device.

11. The device of claim 10, wherein said peripheral device is a disk drive.

12. The device of claim 10, wherein said peripheral device is a cell phone.

13. The device of claim 10 in combination with a cell phone.

14. The device of claim 7, wherein said battery pack is removable.

15. The device of claim 7, wherein said cover is removable.

16. A device, comprising:
a portable computer having first and second major opposing surfaces and having a display disposed on said first major surface; and
a protective cover adapted to releasably engage said computer in a first orientation in which it covers said display, said cover having a battery pack disposed therein
wherein said computer has internal batteries, wherein said cover is adapted to be connected to an external power source and to thereby recharge the battery pack disposed in said cover, and wherein said cover is further adapted to recharge the internal batteries of the computer.

17. A tablet PC, comprising:
a chassis having first and second major opposing surfaces and having a display disposed on said first major surface;
a protective cover adapted to releasably engage said PC in a first orientation in which it covers said display, and being further adapted to releasably engage said PC in a second orientation in which it covers said second major surface; and
a battery pack disposed in said cover;
wherein said battery pack is in electrical communication with the internal circuitry of said tablet PC when the cover is in the second orientation.

18. The tablet PC of claim 17, wherein said battery pack is removable from the exterior surface of said cover when said cover is in the second orientation.

19. A device, comprising:
a portable computer having first and second major opposing surfaces and having a display disposed on said first major surface; and
a protective cover
adapted to releasably engage said computer in a first orientation in which it covers said display,
having a removable battery pack disposed therein; and
adapted to power a peripheral device.

20. The tablet PC of claim 19, wherein said peripheral device is a cell phone.

21. The tablet PC of claim 19, wherein said cover is adapted to provide AC power to a peripheral device.

22. The tablet PC of claim 19, wherein said PC has internal batteries, wherein said cover is adapted to be connected to an external power source and to thereby recharge the battery pack disposed in said cover, and wherein said cover is further adapted to recharge the internal batteries of the computer.

23. The computer of claim 19, wherein the computer has and internal battery which is interchangeable with the battery pack disposed in said cover.

* * * * *